April 8, 1969     M. W. GREDELL     3,436,977
TWO-SPEED AUTOMATIC TRANSMISSION
Filed Jan. 2, 1968
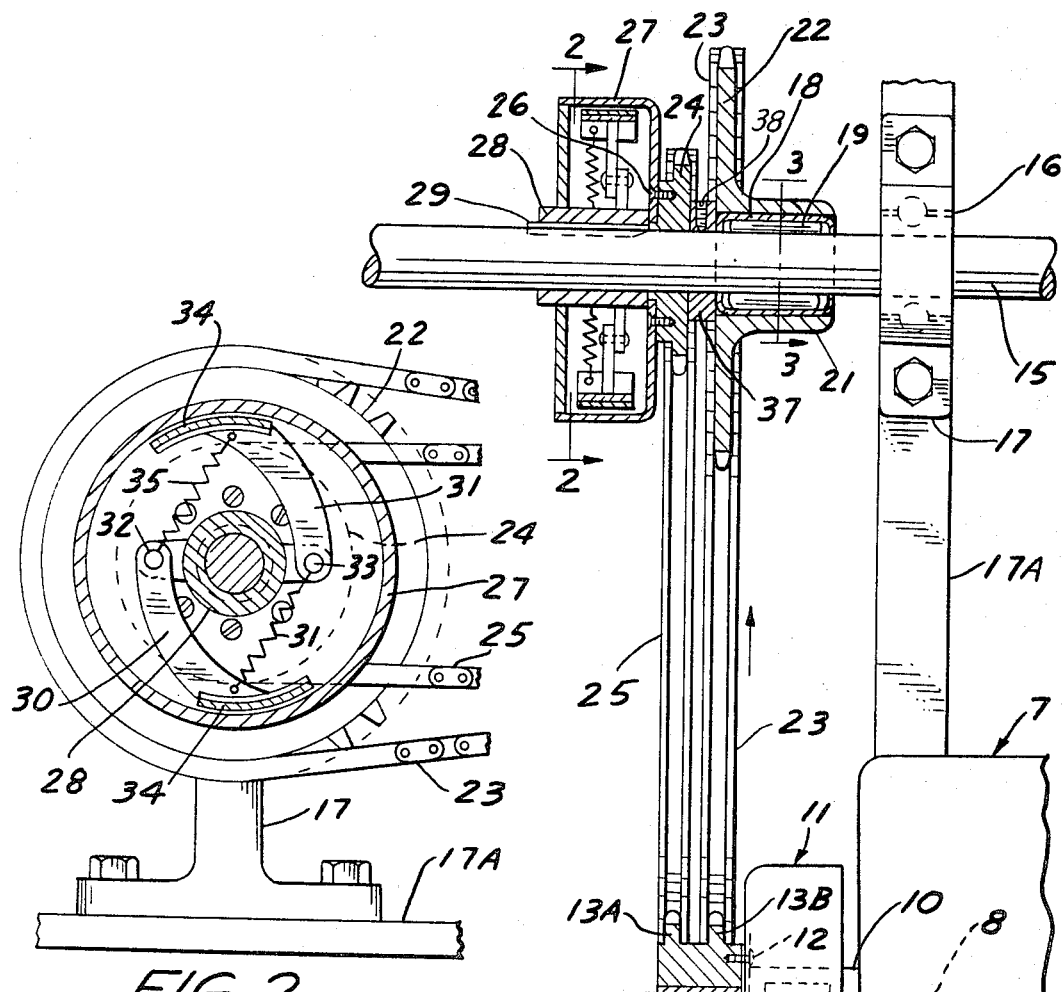
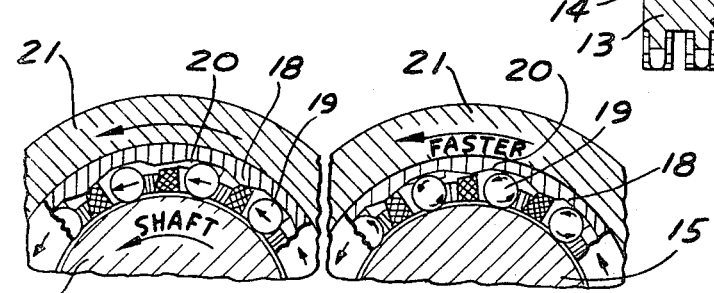
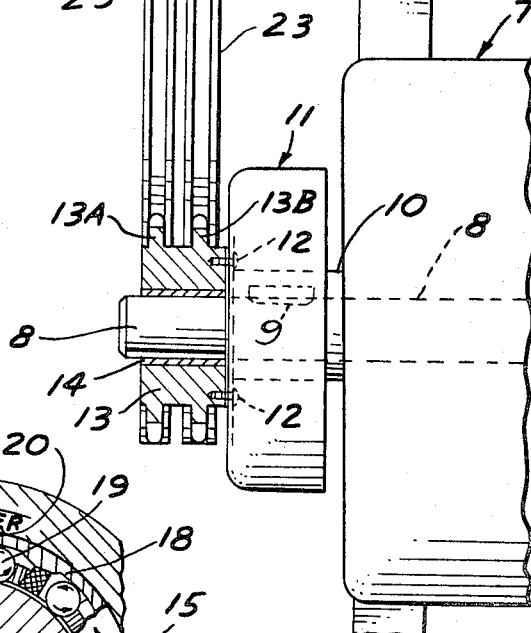
INVENTOR.
MARCELLUS W. GREDELL
BY Edward M. Apple
ATTORNEY

United States Patent Office 3,436,977
Patented Apr. 8, 1969

3,436,977
TWO-SPEED AUTOMATIC TRANSMISSION
Marcellus W. Gredell, 380 Griswold Road,
Northville, Mich. 48167
Filed Jan. 2, 1968, Ser. No. 695,101
Int. Cl. F16h 11/08
U.S. Cl. 74—217
4 Claims

ABSTRACT OF THE DISCLOSURE

This application discloses an automatic, two-speed, power transmission for use in lightweight devices, such as mini-bikes, motor scooters and the like. The invention resides in the provision of a power source having a drive shaft, a counter shaft and a plurality of centrifugal clutches, sprockets and chains, arranged to drive the counter shaft at different speeds, automatically, upon the change of speed of the power source.

---

This invention is an improvement on the device disclosed in United States Patent No. 2,463,100, previously issued to me.

An object of this invention is to generally improve devices of the character indicated and to provide an automatic, two-speed, transmission which is simplified in construction, has fewer working parts, and requires much less material, machining and labor to manufacture and assemble.

Another object of the invention is to greatly improve the performance and efficiency of two-speed, automatic transmissions of the character indicated.

Another object of the invention is to provide a power transmission of the character indicated which is more economical to manufacture and one which requires much less time and expense to maintain in operation.

Another object of the invention is to provide a device of the character indicated which has greatly improved clutching action at any speed and degree of rotation, thereby obviating any tendency of clutch slippage during operation.

Another object of the invention is to provide a device of the character indicated which has a greatly reduced noise level while in operation, particularly at idle speeds.

Another object of the invention is to reconstruct my previous device, so that certain parts are permitted to run free during idle speeds instead of being under power at all times.

The foregoing and other objects and advantages of the invention will become more apparent as the description proceeds, reference being made from time to time to the accompanying drawing, forming part of the within disclosure, in which drawing:

FIG. 1 is a plan view with parts broken away, and parts in section, of a device embodying the invention.

FIG. 2 is an enlarged section taken substantially on the line 2—2 of FIG. 1.

FIG. 3 is a section taken substantially on the line 3—3 of FIG. 1, and shows the roller clutch in engaged condition.

FIG. 4 is a section, similar to that shown in FIG. 3, but showing the roller clutch in overrunning and disengaged condition.

It will be understood that in the embodiment herein disclosed the reference character 7 indicates a variable speed power generator unit, such as a gasoline engine or the like, having a drive shaft 8, to which is keyed, as at 9, the driving element 10 of a conventional centrifugal type automatic clutch, similar in construction to the clutch shown in FIG. 2.

The driven member 11 of the centrifugal clutch is secured, as at 12, to a double sprocket member 13, which is free to rotate with the member 11 on the bearing 14 at idle speeds, and when the rotation of the power generator 7 is not sufficiently high to engage the driving element 10 and the driven element 11.

This is an important feature of the invention as it permits the double sprocket member 13 and both sprockets 13A and 13B and the entire power train following it, to run free at idling speeds. This is an improvement over the structure of my previous patent wherein the two sprockets 13A and 13B, mounted on the shaft 8, were independent of each other. In my previous device the sprocket 13A (FIG. 1) was keyed directly to the shaft 8 and rotated at all times with the shaft 8, both at idling speeds and at high speed. This caused excessive wear on the device and created a very high noise level. My improved structure, as herein disclosed, obviates all of those difficulties, because neither the sprocket 13A, nor the sprocket 13B, rotates until the driven element 11 is connected to the drive element 10 of the clutch.

Mounted parallel to and in spaced relation with the shaft 8, is a counter shaft 15, which is supported for rotation in suitable self-lubricating bearings 16, secured to a support member 17, which in turn is mounted on a table 17A, or other suitable means (FIG. 2). Mounted on the counter shaft 15 is a conventional Torrington drawn cup roller clutch, comprising a raceway or retainer 18, in which is positioned a plurality of comparatively small in diameter and closely spaced roller bearings 19 (FIGS. 1, 3, and 4), which roller bearings 19 are arranged to frictionally engage the counter shaft 15 at a minimal degree of rotation to effect a clutching action between the counter shaft 15 and the raceway 18, when the speed of rotation of the raceway 18 is sufficient to cause the rollers 19 to ride up on the ramps 20. After the clutching action is effected the counter shaft 15 rotates at equal speed with the raceway or retainer 18. The raceway or retainer 18 is press fitted into the hub of a sprocket member 22, over which passes a chain 23 which engages the sprocket 13B previously described.

There is a two to one speed ratio between the sprocket 22 and the sprocket 13B, so that when the sprocket 13B is being driven by the power generator 7, the sprocket 22 will rotate at half the speed of the sprocket 13B.

Also mounted for free rotation on the counter shaft 15 is a sprocket 24, over which passes a chain 25, which chain 25 also engages the sprocket 13A. The speed ratio between the sprockets 13A and 24 is one to one. The sprocket 24 is secured, as at 26, to the drum 27 of an automatic centrifugal type clutch, whose driving member 28 is keyed as at 29, to the counter shaft 15.

The last named clutch has feet 30 and 31, which are pivoted as at 32 and 33, to the driving member 28. The feet 30 and 31 have friction pads 34, which contact the inside surface of the clutch drum 27. The feet 30 and 31 are normally held clear of the clutch drum 27 by means of springs 35 and 36.

In this embodiment I prefer to have the clutch 10 and 11 mounted on the shaft 8 to engage at approximately 1900 r.p.m. of the engine 7, and the clutch 27 and 28 on the counter shaft 15 to engage at approximately 1600 r.p.m.

It will be understood, however, that other speeds and ratios may be employed in the device depending upon the results desired.

The sprockets 22 and 24 are held apart by means of a spacer and thrust bearing member 37, which is secured on the counter shaft 15 by means of a set screw 38.

A typical operating cycle is as follows: when the engine speed reaches 1900 r.p.m. the clutch 10 and 11 engages, causing the sprockets 13A and 13B to rotate at the same speed. Since the speed ratio of the sprockets 13B and 22 is two to one the sprocket 22 will rotate at only 950 r.p.m.

As the sprocket 22 rotates it will also cause rotation of the hub 21, which in turn causes the rotation of the roller raceway, or retainer 18, causing the rollers 19 to ride up on the ramps 20 (FIG. 3), whereby the rollers 19 are brought into frictional engagement with the counter shaft 15, causing the counter shaft 15 to rotate in unison with the sprocket 22. Because of the size and number of the rollers 19, and their close spacing, frictional contact is effected between the driving and driven elements within one or two degrees of rotation. This is important, as it effects a very smooth clutching and release between the rotating elements.

As the speed of the engine 7 is increased and the sprockets 13B and 22 and the hub 21 begin to rotate faster, the speed of rotation of the roller retainer 18 will be likewise increased to the point where the speed of rotation of the member 18 will overrun the speed of the counter shaft 15, at which time the rollers 19 will be free of the ramps 20, so that the rollers will exert less friction on the counter shaft 15 and will ultimately rotate free in the member 18, as shown in FIG. 4, and serve as a roller bearing for the sprocket 22 on the shaft 15.

The clutch 10 and 11 remains in engagement until the counter shaft 15 has attained a speed of approximately 1600 r.p.m. at which time the engine 7 will then be turning at 3200 r.p.m. When the engine 7 reaches a speed of approximately 3300 r.p.m. the counter shaft 15 and the clutch member 27 will be rotating at only 1650 r.p.m., at which speed the clutch members 27 and 34 are set to engage.

Inasmuch as the sprockets 13A and 24 have the same speed ratio a further increase of speed of the sprocket 13A will correspondingly increase the speed of the counter shaft 15, at which time the counter shaft 15 will be rotating faster than the sprocket 22, and because of the one-way clutching action of the members 18 and 19, the sprocket 22 will then run free of the counter shaft 15, and the counter shaft 15 will be driven through the sprockets 13A and 24.

When the engine speed falls below 3300 the clutch 27 and 34 cuts out and the power is then transmitted through the sprockets 13B and 22, as previously described. Further reduction in the engine speed below 1900 r.p.m. causes the clutch 10 and 11 to cut out and the engine then runs entirely free of the transmission.

It is believed that the operation of the device is obvious from the foregoing description.

Having described my invention, what I claim and desire to secure by Letters Patent is:

1. An automatic two-speed power transmission comprising a drive shaft, a counter shaft, a pair of equal size sprockets mounted for free rotation on said drive shaft, a low speed sprocket on said counter shaft, a chain connecting said low speed sprocket to one of the sprockets on said drive shaft, a high speed sprocket on said counter shaft, a chain connecting said high speed sprocket to the other sprocket on said drive shaft, a centrifugal clutch keyed on said drive shaft and having its driven element secured to said first pair of sprockets, a roller clutch assembly having its raceway secured to said low speed sprocket and having its rollers closely spaced and arranged to drive said counter shaft, when a predetermined speed of rotation is reached, and a centrifugal clutch, having its driving elements keyed to said counter shaft and its driven element connected to said high speed sprocket.

2. The structure of claim 1, in which said roller clutch assembly includes a deep drawn cup which is press fitted into the hub of said low speed sprocket and is co-extensive therewith, said cup having a plurality of comparatively small diameter and closely spaced rollers therein.

3. The structure of claim 1, in which said roller clutch assembly serves as a roller bearing for the free rotation of said low speed sprocket on said counter shaft at certain speeds of rotation.

4. The structure of claim 1, in which said low speed and said high speed sprockets are spaced from each other on said counter shaft by a thrust bearing which is secured to said counter shaft.

References Cited

UNITED STATES PATENTS

| | | | |
|---|---|---|---|
| 2,463,100 | 3/1949 | Gredell | 74—217 |
| 2,815,838 | 12/1957 | Dodge | 192—45 |
| 2,835,364 | 5/1958 | Picard | 192—45 |
| 2,916,924 | 12/1959 | Gray | 74—217 |
| 3,011,606 | 12/1961 | Ferris et al. | 192—45 |

FRED C. MATTERN, Jr., *Primary Examiner.*

JAMES A. WONG, *Assistant Examiner.*